G. W. Hildreth.
Canal-Lock Gate.
Nº 1,517. Patented Mar. 19, 1840.
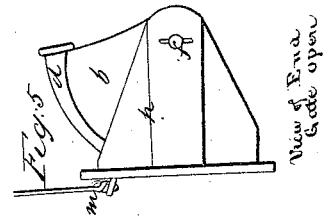
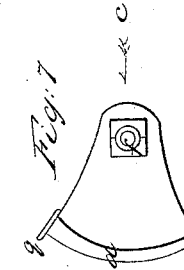
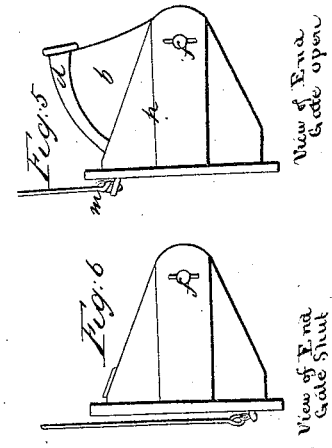
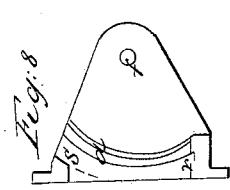
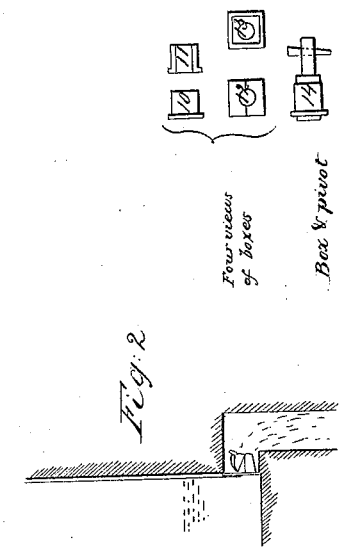
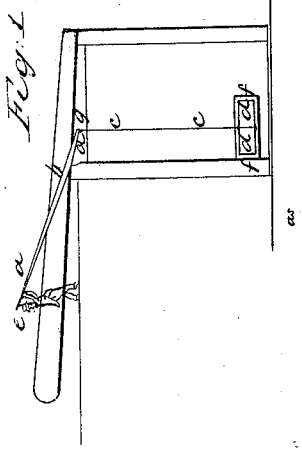
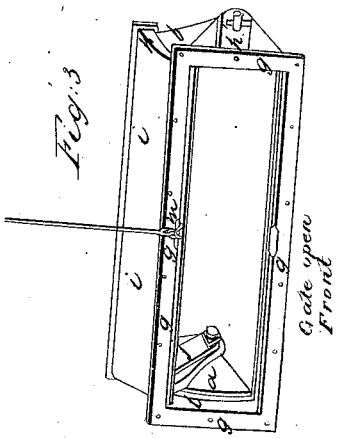
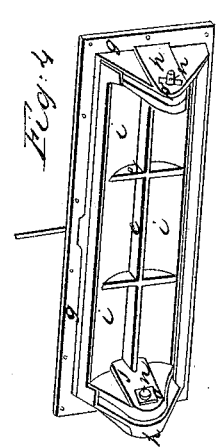
THE GRAPHIC CO. PHOTO-LITH. 39 & 41 PARK PLACE, N.Y.

UNITED STATES PATENT OFFICE.

GEO. W. HILDRETH, OF LOCKPORT, NEW YORK.

SLUICE-GATE FOR CANAL-LOCKS.

Specification of Letters Patent No. 1,517, dated March 19, 1840.

*To all whom it may concern:*

Be it known that I, G. W. HILDRETH, of Lockport, in the county of Niagara and State of New York, have invented a new and improved culvert or sluice-gate for filling locks with water and discharging the same, which gate is also well calculated for waste-weirs and water-wheel gates; and I do hereby declare that the following is a full and exact description.

The nature of my invention consists in making the gate (of cast iron) in the segment of a cylinder with a triangular arm at each end running far enough apart the radial point or center of the cylinder to contain the boxes and pivot on which the gate revolves; the front (or convex side) of the gate is of an oblong form of suitable thickness to sustain the pressure of water in the various situations in which it may be placed. The convex plate (or gate) is strengthened by means of ribs running from edge to edge, and from end to end in the concave side of the gate. The boxes are made of any suitable composition and fitted into the triangular arm of the gate so as to bring the pivot a little below the radial point from which the convex surface of the gate is drawn. The boxes and pivots can be replaced whenever it is necessary. On each end of the gate is cast an eccentric slide, the outer edge of which corresponds with the convex surface of the gate. The inner edge of said slide is drawn with a radius less than the radius of the convex surface of the gate and is drawn from a point below the pivot on which the gate revolves. The lower edge of the gate is made in a suitable form to fit into a groove in the sill of the frame made for that purpose. On the upper edge of the gate is a cap projecting over the convex face of the gate extending the whole length of the gate and also projecting over the upper end of the eccentric slides which are on the ends of the gate the use of which will be seen in giving a description of the gate and frame together. The cast iron frame in which the gate revolves is of an oblong form corresponding with the form of the gate, consisting of a sill two ends and a cap with flanges which are even with the inside of the frame, but projecting on the outside of the frame to make it convenient for bolting the frame to the lock gate or wall in which it is set. The flanges also serve to strengthen the gate frame. At each end of the opening the end of the gate frame extends in a triangular form far enough back to receive the pivot on which the gate revolves, which pivot is put through the end of the frame at a point corresponding with the boxes in the arm of the gate when the gate is in the frame. The pivots are made fast in the end of the frame by a key on the outside of said end of the frame passing through the end of the pivot. The boxes are made fast in the arm of the gate and turn on the pivot. On the inside of the ends of the frame are concentric plates, the outer circle of which corresponds with the inner circle of the eccentric slides on the end of the gate as before described. When the gate is put into the frame and shut with the boxes and pivots in their places as before described the upper convex side of the gate comes to a close joint against the back edge of the cap of the frame. The projecting cap on the top edge of the gate projects over the perpendicular joint just described and rests on the top of the gate frame (but not on the top of the flange). The lower edge of the gate sets into a groove in the sill of the frame made for that purpose.

The eccentric slides on the end of the gate before described rest against the concentric plates on the end of the frame corresponding therewith. Thus a double angular joint is formed at each end of the gate, also at the top and a groove joint at the bottom, so as to effectually prevent it from leaking. The lower edge of the gate and the opening of the frame are a little shorter than at the top edge of the same, so that when the gate is shut it will make a close joint at the ends of the gate, but on opening the gate it immediately recedes from the end of the frame, and by means of the pivots being placed below the radial point (as before described) the upper edge of the gate which rests against the cap of the frame also recedes from the said cap on opening the gate, and also by means of the eccentric slides (before described) which form the end bearings of the gate when shut recede from each other as the gate is opened, relieving the gate from any bearing except the rod by which it is opened and the pivots on which it turns, bringing all the pressure of water and friction upon the pivots. As the gate is opened it passes behind the frame out of the pressure of water, leaving a free open space for the water to pass through.

The rod by which the gate is opened is attached to a stem projecting from the center of the lower side of the convex surface of the gate sufficiently far for the rod to clear the frame. By the pivots being placed below the radial point (before described) the pressure of the water on the convex surface of the gate assists in opening the gate, which may be made more or less effectual by raising or lowering the pivot, so that a very large heavy gate may be made to open with perfect ease on this principle.

The boxes in which the pivots move are made in two parts and may be made square, octagon, or any other shape on the outside which may be preferred. The inner side must be bored out round of suitable size to fit the pivot.

To enable others skilled in the art to make and use my invention, reference may be had to the drawings.

Figure 1. shows the appearance when put into a lock gate. $a, a$, is the lever to open the gate. $b$, is the pivot upon which the lever moves. $c, c$, is the rod which attaches the lever to the gate. $d, d$, is the gate which is opened by the lever $a, a$. $f, f$, is the gate frame in which the gate moves.

Fig. 2 shows the gate open in the culvert in the side wall.

Fig. 3 is a perspective view of the front side of the gate when open. $g, g, g, g$, is the cast-iron frame in which the gate moves. $a.$, is the inside view of the end of the frame. $h$, is the outside view of the end of the frame. $i, i$, is the cast-iron gate which moves in the frame $g, g, g, g$. $b$, is the outside view of the end of the gate. $j$, is the inside view of the end of the gate. $n, n$, are the pivots on which the gate turns. $k$, is the slide on the gate which rests against the concentric plates. $l$, is a concentric plate which $k$ rests against when the gate is shut. $m$, shows the manner of attaching the rod to the gate. $p$, is the key to fasten the pivot into the frame.

Fig. 4 is a perspective view of the back side of the gate when shut. $g, g, g$, is the cast-iron frame. $h, h$, are the ends of the frame. $i, i, i$, is the gate. $j$ is the inside view of the end of the gate $i, i, i$. $n, n$, are the pivots upon which the gate turns. $o$, is the box for the pivot to turn in. $e, e$, are ribs to strengthen the castings. $p$, is the key to fasten the pivot in the frame. The round holes in the frame are for bolting it to the main gate or wall in which it is set.

Fig. 5 is the end view of the gate and frame when open. $h$, is the end of the gate frame. $b$ is the end of the gate. $d$ is the slide which rests against the plate $d$ in Fig. 8 when the gate is shut. $f$, is the pivot. $m$ is the manner of attaching the rods to the gate.

Fig. 6 is the outside view of the end of the frame.

Fig. 7 is the outside view of the end of the gate. $d$, is the slide which rests against $d$ in Fig. 8 when the gate is shut. $q$, is the cap to secure a close joint when the gate is shut.

Fig. 8 is the inside end view of the frame. $d$ is the concentric plate. $s$, is the space for the slide $d$, as in Fig. 7, when the gate is shut. $v$ is the groove for the gate to shut into to secure a close joint.

Fig. 9 is a sectional view of Fig. 7. $f$ is the pivot. $t$ is the end of the gate. $u$ is the collar on the pivot between the end of the frame and the end of the gate. $o$ is the box in which the pivot turns.

The inner circle of the concentric slides marked $d$ in Figs. 5 and 7 and the outer circle of ditto in Fig. 8 are drawn from a point below the pivot $f$, on which the gate turns, and thereby the slides are relieved from their bearings immediately on opening the gate, which brings the whole pressure of water and friction upon the pivot $f$ where it is easily overcome.

Fig. 10 is the outside view of the boxes, which are made of composition or brass.

Fig. 11 is the inside view of the boxes.

Fig. 12 is the inside end view of the boxes.

Fig. 13 is the outside end view of the boxes.

Fig. 14 is the pivot box and key.

Fig. 15 is the pivot and key, which are made of iron.

What I claim as my invention and desire to secure by Letters Patent, is—

1. The making of the gate in the segment of a cylinder revolving on a pivot at each end and fitting against concentric plates attached to the frame in which the gate moves as herein described.

2. I claim the placing of the pivots of the segment gate below the center of the circle (of which the segment gate is a part), so that in closing the gate a close joint shall be formed, and by the same means a greater pressure of water is brought upon the gate above the pivots than below which assists in opening the gate as described.

3. I also claim as a substitute for the preceding, the placing the pivots of the segment gate in the center and placing the plates against which the gate slides a little eccentric thereto for the same purpose and in the manner described.

G. W. HILDRETH.

Witnesses:
WILLIAM GLASGOW,
CHAS. SEYMOUR.